United States Patent [19]

Toyota et al.

[11] Patent Number: 4,806,370

[45] Date of Patent: Feb. 21, 1989

[54] 5'-NUCLEOTIDE SEASONING COMPOSITION AND PRODUCTION THEREOF

[75] Inventors: Takeshi Toyota, Kyoto; Toshihiko Kanemaru, Nagaokakyo; Hiroshi Kasai, Kawabe, all of Japan

[73] Assignee: Takeda Chemical Industries, Ltd., Osaka, Japan

[21] Appl. No.: 103,823

[22] Filed: Oct. 2, 1987

[30] Foreign Application Priority Data

Jul. 8, 1987 [JP] Japan ................................ 62-170751

[51] Int. Cl.$^4$ ........................ A23L 1/229; A23L 1/221
[52] U.S. Cl. ....................................... 426/99; 426/537; 426/650
[58] Field of Search ..................... 426/96, 99, 97, 307, 426/537, 650

[56] References Cited

U.S. PATENT DOCUMENTS

| 3,198,638 | 8/1965 | Katsuharu et al. | 426/537 |
|---|---|---|---|
| 3,389,000 | 6/1968 | Fujita et al. | 426/537 |
| 3,524,747 | 8/1970 | O'Hara et al. | 426/537 |
| 3,709,701 | 1/1973 | Samejima et al. | 426/537 |
| 4,243,691 | 1/1981 | Mohlenkamp et al. | 426/537 |

FOREIGN PATENT DOCUMENTS

| 0682923 | 3/1964 | Japan | 426/537 |
|---|---|---|---|
| 40-3467 | 2/1965 | Japan | |
| 42-1470 | 1/1967 | Japan | |
| 56-96680 | 8/1981 | Japan | |
| 58-94366 | 6/1983 | Japan | |
| 61-238335 | 10/1986 | Japan | |
| 62-255 | 1/1987 | Japan | |
| 62-29956 | 2/1987 | Japan | |

OTHER PUBLICATIONS

Official Gazette of the National Bureau of Standards, Ministry of Economic Affairs, vol. 14, No. 19, Oct. 1, 1987, p. 32, Publication No. 091313 (Republic of China).

Primary Examiner—Donald E. Czaja
Assistant Examiner—Helen Pratt
Attorney, Agent, or Firm—Wenderoth, Lind & Ponack

[57] ABSTRACT

Seasoning composition is produced with a method, which comprises coating fine particles of sparingly water-soluble 5'-ribonucleotides having a total water content of 12 to 20 weight % and a particle diameter not exceeding about 150 μm with an oil/fat and/or a wax melting at a between about 55° C. to about 90° C. The thus obtained seasoning composition causes very little cracks or gaps on the surface of coated particles even after storage for a long time. Accordingly this composition is applicable with advantage to foods because of good protection from degradation of 5'-ribonucleotides due to phosphatase.

13 Claims, No Drawings

5'-NUCLEOTIDE SEASONING COMPOSITION AND PRODUCTION THEREOF

This invention relates to a seasoning composition containing sparingly water-soluble 5'-ribonucleotide salts against enzymes and a method of preparing said composition, which comprises coating sparingly water-soluble 5'-ribonucleotide salts with an oil/fat and/or a wax.

Flavorant 5'-ribonucleotides such as sodium 5'-inosinate, sodium 5'-guanylate, etc. not only have their own characteristic tastes but have the properties of showing remarkable synergistic effect for producing potentiated tastes when used in combination with other flavorants such as sodium glutamate, of moderating stimulant tastes such as strong saltiness or sourness, and of remarkably reducing unpleasant odour such as amino acid odour or powdery odour originated from protein hydrolyzate or starch respectively, so that they are indispensable seasonings alongisde of sodium glutamate in the manufacture of processed foods today.

These 5'-ribonucleotides are very stable under the ordinary food processing conditions and against pH in the range encountered in the field of foodstuffs, so that they are little decomposed whether chemically or physically. However, these substances have the disadvantage that the ester bond in the 5'-position is very vulnerable to the attack of phosphatase so that they easily lose their flavoring quality. The phosphatase is an enzyme widely distributed in animal and vegetable materials or fermented foods.

Heretofore, in the manufacture of foods from raw materials containing phosphatase activity, the following measures have been taken for using 5'-ribonucleotides effectively.

(1) A method which comprises heating raw materials to thereby inactivate phosphatase in advance, then adding thereto 5'-ribonucleotides (Japanese published unexamined patent application No. 62-51969).

(2) A method which comprises adding an agent for inhibiting the action of phosphatase, for example, dehydroascorbic acid or penicillamine esters (Japanese published examined patent application Nos. 46-16948 and 48-10228).

(3) A method which comprises leading 5'-riboncleotides to corresponding sparingly soluble salts to have the dissolution delayed as long as possible, during which time the cooking under heating is conducted to thereby inactivate the enzyme (Japanese published examined patent application No. 43-24942).

(4) A method which comprises coating 5'-riboncleotides with a coating agent which is solid at room temperature and resistant to water but is melted when heated, so that the 5'-ribonucleotides are microcapsulized not to be in contact with phosphatase (Japanese published examined patent application Nos. 37-13725 and 42-1470).

As stated in the foregoing, it has been reported as effective that coated 5'-riboncleotides are added to those foods which contain high phosphatase activity and heated after addition of various seasoning agents (e.g. steamed and kneaded fish pastes such as kamaboko, chikuwa, etc., and kneaded animal meat products such as sausages, hamburgers, etc.) or those foods such as miso which are preferably not heated in order to preserve their flavours or texture. However, it is not said that practically satisfactory products have been obtained by any of the known coating methods. As it is suspected, because of insufficient coating or a low affinity of 5'-ribonucleotides for oils/fats after coating, the 5'-ribonucleotides are too ready to dissolve out in the presence of water and are decomposed by phosphatase. Moreover, in case of sparingly water-soluble 5'-ribonucleotide salts, their coated products obtained by known coating methods are poor in storability, because they tend to cause cracks or gaps on the surface of coated particles after storage for a long time.

While taking into consideration the circumstances stated as above, the present inventors have undertaken research in regard to methods of coating 5'-ribonucleotides and revealed that coating of sparingly water-soluble 5+-ribonucelotides with a water content in a certain range and a particles diameter in a certain range with an oil/fat and/or a wax affords a product which is more stable against phosphatase than is any other conventional product, thus the present invention being accomplished.

The present invention is therefore directed to a seasoning composition containing sparingly water-soluble 5'-ribonucleotide salts which is produced by coating fine particles of sparingly water-soluble 5'-ribonucleotide salts having a total water content of 12 to 20 weight % and a particle diameter not exceeding about 150 $\mu$m with an oil/fat and/or melting at a temperature between about 55° C. to about 90° C., and production thereof.

Examples of the sparingly water-soluble 5'-ribonucleotides to be employed in the present invention include salts of 5'-inosinic acid and 5'-guanylic acid, whose solubility is less than about 1 g/100 g water at 25° C. Specific examples of the salts include edible alkaline earth metal salts (e.g. calcium salts, barium salts, and magnesium salts) and aluminum salts as well as mixtures thereof [e.g. calcium 5'-ribonucleotide (a mixture of calcium 5'-inosinate and calcium 5'-guanylate)]. Usually, calcium salts are preferably employed. In addition to such flavoring 5'-ribonucleotide salts, there may be added a sparingly water-soluble salt of 5'-adenylic acid, 5'-uridylic acid or 5'-citidylic acid.

Before being coated with an oil/fat or a wax, sparingly water-soluble 5'-ribonucleotides salts are prepared to those having a total water content of about 12 to 20 weight %, preferably about 12 to 16 weight % and a particle diameter not exceeding about 150 $\mu$m. The term "Total water content" as used herein means that total water contained in 5'-ribonucleotide salts irrespective of its origin, such as water of crystallization, adherent water or both (hereinafter sometimes referred to as simply "water content"). The total water content can be determined by the method described in "The Japanese Standards of Food Additives, Fifth Edition", that is to say, the moisture content determination method (Karl Fischer method) or the loss-on-drying method (120° C., 4 hours). While the above "The Japanese Standards of Food Additivies" specifies that the moisture content of 5'-ribonucleotides shall be 23.0% or less for calcium 5'-ribonucleotide, the starting materials in the present invention are those whose total water content is in the range of from 12 to 20 weight %, which is one of the salient features of the present invention. The equilibrium water content of sparingly water-soluble salt of 5'-ribonucleotide is dependent on the respective salts, but it is in the range of approximately from 12 weight % to 16 weight %, and it is most desirable to have the total water content to be within the above range. More concretely stated, if the water content is more than or less than that within the above range, cracks or gaps occur to the coating material when the water content of the 5'-ribonucleotide salt in the coated material becomes equilibrium by the change of exterior environment, thus the coating effect undergoes deleterious effect with time.

The particle diameter of sparingly water-soluble 5'-ribonucleotide salts is not more than about 150 μm. Moreover, it is preferable that particles having the diameter not larger than about 105 μm and not smaller than 20 μm account for at least about 80 weight % and that the specific volume is within the range of about 1.4 to 2.0 ml/g. The shape of particles is preferably spherical or near-spherical, but those having the total water content and particle diameter as described above can be employed irrespective of shapes in detail.

The preparation of sparingly water-soluble 5'-ribonucleotide salts for use in accordance with the present invention comprises subjecting those prepared by a conventional method such as a neutrailizing method or exchange-salt method to, for example, drying under reduced pressure at about 80° C. for 12 to 24 hours to make the water content to that within the above-mentioned range, followed by pulverization by means of a hammer mill or ball mill or pin mill, or subjecting to drying to make the water content to that within the above-mentioned range, pulverization by means of the above-mentioned method, followed by adjusting to a given moisture content.

As an alternative, water is added to wet crystals of sparingly water-soluble 5'-ribonucleotide salts before drying to make a slurry of about 10 to 25% concentration which is then dispersed with a grinder-type emulsifying machine, followed by subjecting the resultant to spray-drying with a hot air inlet temperature of about 150° C. to 250° C. and at a temperature of about 95° C. to 130° C. in the drying chamber to give particles having a given water content and particle diameter.

The oil/fat and/or the wax which can be used for the purposes of the present invention is an edible one which melts at about 55° C. to 90° C. Examples of such oil/fat include vegetable and animal oils and fats, hydrogenation products thereof. Examples of such waxes include natural ones of animal, vegetable and mineral origin.

As specific examples of said oil/fat there may be mentioned hydrogenated beef tallow, hydrogenated fish oil, hydrogenated sperm oil, hydrogenated rapeseed oil, hydrogenated soybean oil, hydrogenated peanut oil, hydrogenated cottonseed oil, hydrogenated safflower oil, hydrogenated rice bran oil and so on. Furthermore, fatty acids of 14 to 28 carbon number and melting at about 55° C. to 90° C. (e.g. palmitic acid, stearic acid, behenic acid, etc.) can also be employed, which are regarded as falling within the scope of the above-mentioned oils/fats.

Examples of waxes include edible natural ones such as candelilla wax, rice wax, carnauba wax, bee's wax and so on.

These oils/fats and waxes may be used either singly or in combination for the purpose of adjusting the melting point to a desired temperature. For example, waxes and oils/fats can be mixedly used at a ratio of 60 to 100 weight parts of the former to 100 weight parts of the latter. Further, provided that the above-mentioned melting point range is adhered to, fatty acid esters such as monoglycerides, diglycerides and triglycerides, sorbitan fatty acid esters sucrose fatty acid esters, soybean lecithin and other emulsifying substances may be concomitantly used in suitable proportions for the purpose of improving the grain geometry and free-flowing property of the resulting coated powder.

As reagrds the coating method, there may be employed the spray granulation method in which fine particles of the above-mentioned sparingly water-soluble 5'-ribonucleotide salts are dispersed in a melt of oils/fats and/or waxes at about 60° C. to 105° C., preferably at about 60° C. to 95° C. and the dispersion is sprayed into a cooling tower maintained at about 10° C. to 35° C. with rotating disc or nozzle, the method in which the above-mentioned hot dispersion is cooled to solidify and the resultant is crushed, the method in which fine particles of sparingly water-soluble 5'-ribonucleotide salts are floated in air stream and liquid oils/fats or/and waxes (melted by heating or dissolved in a suitable solvent) to coat the particles, or the coating method utilizing a coating pan. Among these methods, the spray-granulation method under cooling is preferably from the viewpoint of obtaining more uniformly coated particles. A rotary disc spray, for example, can be preferably carried out under the following operation conditions:

Disc diameter: 100 to 200 mm, Temperature of disc: 130° C. to 200° C., Rotary rate of disc: 1200 to 3000 rpm, Feed rate of dispersion: 200 to 600 ml/min., Temperature of dispersion: 80° C. to 100° C., Temperature of cooling tower: 10° C. to 35° C.

In addition to the coated product obtained as above, a second and a third coating layer may be further formed with the same or different oils/fats and/or waxes for an enhanced covering effect. Generally, the oils/fats and/or waxes are selected from such a range as the content of sparingly water-soluble 5'-ribonucleotide salts is in a range of 20 to 60 weight % in terms of anhydrates thereof.

In the seasoning composition according to the present invention, the content of sparingly water-soluble 5'-ribonucleotide salts is preferably in a range of about 23 to 46 weight %, and the amount of the oils/fats and/or waxes and other additives, if any, are accordingly determined.

If the coverge of the oils/fats and/or waxes is less, the stabilizing effect against phosphatase is diminished, and if the oils/fats and/or waxes is excessive, the coating material may deposit out as white spots when the seansoning composition is added to food, thus giving undesirable results in many instances. As to the particle size of the product, the coating thickness is greater as the particle diameter and the oils/fats and/or the waxes content are increased but when the seasoning composition is added to food and subjected to milling or the like operation, there is an increased risk of the particles being mechanically destroyed so that the substantial residue rate of 5'-ribonucleotides is decreased. From the above points of view, coating is preferably carried out with particles in the range of not more than 500 μm, preferably from 250 μm to 150 μm.

Foods to which the seasoning composition according to the present invention is applicable with advantage are those which are subjected to heating beyond the melting point of the oils/fats and/or waxes in the course of manufacture or those which are cooked before eating at home. As examples of such foods, there may be mentioned common dishes including fish paste products such as kamaboko, chikuwa, fried kamaboko, fish meat sausage, etc.; animal meat processed products such as sausage, ham, hamberger, meat ball, etc.; miso [a seasoning prepared by fermenting soybean and rice (or wheat) on *Aspergius oryzae*] delicacies; and ingredients for dumplings, shaomai, meat bun; batters for fried food, crep tempura; and so on.

The seasoning composition according to the present invention is added to a mixing stage prior to heating in the manufacture of food. Even if phosphatase is present before heating, since the fine particles of sparingly water-soluble 5'-ribonucleotide salts are uniformly coated with the oils/fats and/or the waxes, the 5'-ribonucleotides are not exposed to the enzymatic attack and decomposed. And, after the phosphatase has been inactivated by heating, the covering oils/fats and/or wxes melt away and the sparingly water-soluble 5'-ribonucleotide salts are retained in stable state in the food to thereby display their flavoring effects.

The seasoning composition obtainable by the present invention comprises fine particles of sparingly water-soluble 5'-ribonucleotide salts coated with an oil/fat and/or a wax uniformly and with a high affinity for each other. Compared with the seasonings prepared by the conventional coating techniques, the dissolution of 5'-ribonucleotides upon immersion in water at normal temperature is controlled substantially completely. Besides, the coating layer, the oil/fat and/or the wax, is dissolved at the stage where phosphatase is inactivated, so that satisfactory seasoning effect can be attained. Further, the seasoning composition of this invention causes very little cracks or gaps on the surface of coated particles even after storage for a long time, thus being excellent is storability, which is also a great characteristic feature. The seasoning composition according to the present invention retains its coating layer quite intact even when it is subjected to mixing, milling and other methanical operations during manufacture of food so that it can be suitably used for the seasoning of steamed and kneaded fish.animal paste products as well as various household dishes.

EXAMPLES

The following experimental, use and working examples are further illustrative of the present invention in more detail. In the following, % means weight % unless otherwise specified.

EXPERIMENTAL EXAMPLE 1

Wet crystals of 5'-ribonucleotide calcium obtained by a conventional method were subjected to drying at 80° C. for 8 hours (A), 24 hours (B) and 48 hours (C), under reduced -pressure to prepare dry samples. The water contents of the respective samples, determined by Karl Fischer's method, were 20.4% (A), 13.2% (B) and 6.9% (C).

EXPERIMENTAL EXAMPLE 2

A paste was prepared from 6 kg of pork, 4 kg of beef, 5 kg of pork lard, 4 kg of water, 1.5 kg of potato starch, 2 g of sodium nitrite, 20 g of crystalline smoke flavor and 10 g of sodium L-ascorbate in accordance with the conventional manner for preparing sausage. To thus-prepared paste was added ribotide (a mixture of approximately equal amounts of sodium 5'-inosinate and sodium 5'-guanylate, water content 24%, manufactured by Takeda Chemical Industries, Ltd.). Each of the 5'-riboncleotide calcium (A), (B) and (C) as obtained in Experimental Example 1 was crushed by a ball mill to give the fine particles of diameters not exceeding 150 μm. To each portion of the above-prepared paste was added each portion of the particles so that the content of sodium 5'-ribonucleotide (anhydride) may be 0.05%. The respective mixtures were kneaded thoroughly, and each mixture was filled into a cellophane casing with a flat width of 23 mm, and smoked at an increasing temperature of 50° C. to 70° C. over 90 minutes, and steamed at 80° C. for 30 minutes to prepare four kinds of sausages.

The sausages prepared as above were evaluated for taste and flavor by a panel of 10 expert tasters. As a result, no difference at all was found among the samples. It was revealed that even sparingly water-soluble calcium salts, when finely powdered, are unstable against phosphatase like water-soluble salts.

EXPERIMENTAL EXAMPLE 3

Fine particles (A) of calcium 5'-ribonucleotide obtained by the method of Experimental Example 1 were further subjected to drying at 80° C. to prepare dry samples having each water content of 9.2%, 10.1%, 11.3% and 16.2%, under reduced pressure. A 700 g portion of hydrogenated rapeseed oil (m.p. 67° C.) was melted at 80° C., in which were evenly dispersed 300 g each of dried samples obtained above. The dispersion was adjusted to 75° C., followed by granulation after manner of Example 1. These coated calcium 5'-ribonucleotide (F), (G), (H), (K), (J) and (K) were stored for six months in a chamber of 25° C. with relative humidity of 85%, and the respective moistures and dissolution rate were measured.

The results were shown in Table A. As apparent from the results, dissolution rates of (I), (J) and (K) were very low even after storage, while (F), (G) and (H) showed increasing in the dissolution rates.

TABLE A

| Sample | Moisture (%) | | | Dissolution rate* | |
|---|---|---|---|---|---|
| | I | II | III | Before storage | After storage |
| F | 9.2 | 4.21 | 13.9 | 1.5 | 10.2 |
| G | 10.1 | 4.24 | 14.1 | 1.4 | 9.2 |
| H | 11.3 | 4.32 | 14.5 | 1.6 | 8.6 |
| I | 12.5 | 4.16 | 14.2 | 1.2 | 1.8 |
| J | 13.4 | 4.19 | 14.4 | 1.5 | 1.9 |
| K | 16.1 | 4.22 | 14.6 | 1.7 | 1.9 |

I: Moisture of starting calcium 5'-ribonucleotide
II: Moisture of coated calcium 5'-ribonucleotide after storage
III: Moisture relative to calcium 5'-ribonucleotide in coated products after storage.
*Shaking time: 60 minutes.

EXAMPLE 1

A 700 g portion of carnauba wax (m.p. 83° C.) was melted at 100° C., in which were dispersed 300 g of fine particles (sieved through a 149 μm-opening) of 5'-ribonucleotide calcium (B) (water-content: 13.2%) obtained in Experimental Example 1. The dispersion was adjusted to 95° C. Using a rotary disc spraying device (disc diameter 15 cm. 2500 rpm), the dispersion was sprayed into a chamber maintained at 25° C. to give coated granules.

The content of 5'-ribonucleotide calcium (calculated as anhydride) in the thus-obtained product [coated ribonucleotide calcium (B), sieved through a 500 μm-opening] was 25.7%, and the dissolution test conducted in the manner described in the following revealed that the dissolution rates were 0.8% after 20 minutes and 1.2% afteer 60 minutes.

\<Dissolution test\>

A ground stopper conical flask of 200 ml capacity was filled with 100 ml of water and placed in a thermostatic shaking water vessel at 25° C. To the flask was added 500 mg of the sample and the flask was shaken at 130 rpm for 20 minutes and 60 minutes. After shaking, the solution was subjected to filtration through a membrane filter (pore-diameter 0.45 μm), and the content of 5'-ribonucleotide in the filtrate was determined by means of liquid chromatography. The dissolution rate shown in the percentage of dissolved 5'-ribonucleotide relative to the 5'-ribonucleotide content of each coated product. \<Assay method of 5'-ribonucleotide content by liquid chromatography\>

Column: MIC GEL CDR 10 (4φ×150 mm)
Temperature of column: room temperature
Mobile phase: pH 4.5, 0.5M acetic acid buffer
Pressure: 50 kg/cm$^2$
Flow rate: 1.0 ml/min.
Detector: UV 254 nm
Sample volume: 20 μl

EXAMPLE 2

In 700 of hydrogenated beef tallow (m.p. 61° C.) melted at 80° C. was evenly dispersed 300 g each portion of fine particles (sieved through at 149 μm-opening) of 5'-ribonucleotide calcim (A), (B) and (C) obtained by Experimental Example 1. Each dispersion was adjusted to 75° C., followed by granulation after the manner of Example 1.

These coated ribonucleotide calcium (A), (B) and (C) were stored for two months in a chamber of 25° C. with relative humidity of 75%, and the respective moistures and dissolution rates was measured.

The results were shown in Table 1. As apparent from the results, the dissolution rate of (B) was very low even after storage, while (A) and (C) showed increasing in the dissolution rates, respectively. In respect of the water-content, (A) showed a greater lowering as compared with that of (B), while (C) showed increase of the water-content.

EXAMPLE 3

At 100° C. was melted 700 g of hydrogenated castor oil (m.p. 85° C.) by heating, into which was thoroughly dispersed 300 g of fine particles of calcium 5'-guanylate obtained at normal temperature (all passing a 149 μm-opening sieve, water content 12.4%). The dispersion was adjusted to 95° C. and granulated in the same manner as Example 1.

The 5'-guanylic acid content (calculated as anydride) of the resulting product (coated calcium 5'-guanylate, all passing a 500 μm sieve) was 26.0%, and the dissolution rate was 0.9% after 20 minutes and 1.4% after 60 minutes.

EXAMPLE 4

To 40 kg of heat-melted hydrogenated rapeseed oil (m.p. 67° C.) was added little by little 27 kg of carnauba wax (m.p. 83° C.). The mixture was completely melted at 100° C. To this molten material was added gradually 33 kg of fine particles of calcium 5'-ribonucleotide prepared after the manner of Experimental Example 1 (water content: 15.5%, all passing through 149 μm-opening sieve) to make a homogeneous dispersion, which was adjusted to 85° C. to 90° C., followed by preparing coated granules by means of a rotary disc spray device under the following conditions.

Disc diameter: 150 mm
Temperature of heating the disc: 160° C. to 170° C.
Rotary rate of the disc: 2000±50 rpm
Feed rate of suspension: 380 to 400 ml/min.
Temperature of chamber: 25°±5° C.

The product was sieved through a 500 μm-opening sieve. The particles passing the sieve accounted for 98% of the total volume. The calcium 5'-ribonucleotide content (calculated as anhdride) was 27.8%, and the dissolution rate was 0.9% after 60 minutes.

EXAMPLE 5

Using a hammer mill (manufctured by Hosokawa Tekkosho Co., Japan) was crushed calcium 5'-inosinate (water content: 13.8%), followed by sieving to give particles of (D) of 32 mesh (500 μm-popening) to 48 mesh (297 μm-opening), (E) of 48 mesh (297 μm-opening) to 80 mesh (177 μm-opening) and (F) of less than 100 mesh (149 μm-opening).

In 650 g each portion of hydrogenated soybean oil (m.p. 65° C.) melted by heating at 85° C. was dispersed 350 g each of the above-mentioned calcium 5'-inosinate (D), (E) and (F), followed by granulation after the manner of Example 1.

From the respective coated granules of calcium 5'-inosinate thus obtained, those passing through a 32 mesh sieve were collected, respectively, and the content (calculated as anhydride) and the dissolution rate were examined.

TABLE 1

| Coated 5' ribonucleotide calcium | Moisture of starting 5' ribonuclcotide calcium | Moisture of 5' ribonucleotide calcium storage (%) | Moisture relative to ribonucleotide calcium* (%) | Dissolution rate before storage (%) 20 min. | Dissolution rate before storage (%) 60 min. | Dissolution rate after storage (%) 20 min. | Dissolution rate after storage (%) 60 min. |
|---|---|---|---|---|---|---|---|
| A | 20.4 | 4.4 | 16.2 | 2.1 | 4.7 | 4.8 | 11.6 |
| B | 13.2 | 4.1 | 14.2 | 0.8 | 1.2 | 0.9 | 1.3 |
| C | 6.9 | 4.3 | 13.8 | 0.8 | 1.4 | 3.5 | 7.9 |

*in coated products after storage

As shown in Table 2, the dissolution rate was the smallest in the coated condiment (E) above.

TABLE 2

| No. | Particle size of calcium 5'-inosinate | Content of calcium 5'-inosinate (anhydride) (%) | Dissolution rate (%) (60 minutes) |
|---|---|---|---|
| C | 32 M–48 M(500 μm–297 μm) | 31.7 | 10.2 |
| D | 48 M–80 M(297 μm–177 μm) | 30.1 | 6.5 |
| E | all passing through 100 M(less than 149 μm) | 29.8 | 1.2 |

Use Example 1

Each of ribotide, 5'-ribonucleotide calcium (B) obtained by Experimental Example 1 and the coated 5'- ribonucleotide salts obtained by Examples 1 to 4 was applied in a manufacture of sausage to prepare test samples. Then, the content of remaining 5'-ribonucleotide was determined and, at the same time, comparative evaluation of taste and flavor of the sausage samples was conducted.

The composition and manufacturing method of the sausage were in accordance with those in Experimental Example 2, and the level of addition was 0.05% as 5'-ribonucleotide sodium (anhydride).

The residual 5'-ribonucleotide content in the sausage samples and the sensory test results of their taste and flavor were shown in Table 3.

It is apparent from the results that the coated samples are higher in % residue and more intense in taste and flavor.

TABLE 3

| No. | Sample | Residue rate (%) | Intensity of taste & flavor |
|---|---|---|---|
| 1 | Ribotide (Control 1) | 11.2 | ± |
| 2 | Calcium 5'-ribonucleotide (B) (Control 2) | 10.8 | ± |
| 3 | Coated product of Example 1 | 100.0 | +++ |
| 4 | Coated product (B) of Example 2 stored for 2 months | 92.0 | +++ |
| 5 | Coated product of Example 3 | 100.0 | +++ |
| 6 | Coated product of Example 4 | 100.0 | +++ |

Intensity of taste and flavor: ±: same as control, + to +++: stronger than control

Use Example 2

A milled fish paste of the grade for manufacturing kamaboko was prepared from 1863 g of frozen Alaska pollack, 54 g of sodium chloride, 27 g of sucrose, 135 g of potato starch, 54 ml of a fermented liquid condiment ("Ajishirube A" manufactured by Takeda Chemical Industries, Ltd., pH 3.7, alcohol 7.5 V/V%, sodium chloride 2.2%, whole sugar 42% whole nitrogen 73 mg%, extract 55%), 13.5 g of sodium L-glutamate and 540 ml of ice-water. Ribotide and the coated calcium 5'-guanylate obtained by a method of Example 3 were added respectively at the level of 0.05% as 5'-ribonucleodie, followed by thorough mixing. Each mixture was filled into a tubing with a lay-flat width of 45 mm and, after 2 hours' setting at 37° C., heated t 90° C. for 30 minutes to give a casing-packaged kamaboko. The 5'-ribonucleotide contents of the products were measured to reveal that the % residues of ribotide and calcium 5'-guanylate were 0% and 93%, respectively, thus the samples showing higher % residue, being more stable and having remarkably excellent taste and flavor as compared with the control group.

Use Example 3

In 300 ml of water was dispersed 100 g of wheat flour. Ribotide and the coated ribonucleotide obtained in Example 4 were added to the dispersion at the level of 0.03% as 5'-ribonucleotide sodium (anhydride). Thus-prepared samples were stored at 15° C. for 30 minutes, 1 hour, 2 hours, and 4 hours, respectively, followed by heating. The % residues of 5'-ribonucletide were measured and comparative evaluation of taste and flavor were conducted.

As shown by the results in Table 4, in the control group, 5'-ribonucleotide was completely decomposed, while, in test sample groups, 5'-ribonucleotide remained stable even after 4 hours, thus, taste and flavor were apparently intensive in the test sample groups than in the control group.

TABLE 4

| | | % residue | | | |
|---|---|---|---|---|---|
| No. | Sample | 30 min. later | 1 hr. later | 2 hr. later | 4 hr. later |
| 1 | Ribotide (control) | 0 | 0 | 0 | 0 |
| 2 | Coated (Example 4) | 86 | 80 | 78 | 77 |

Use Example 4

To 500 g each portion of unheated shinshu miso were added respectively calcium 5'-ribonucleotide (B) obtained in Experimental Example 1 and coated products obtained in Example 4 at the level of 0.035% as sodium 5'-ribonculeotide (anhydride), followed by thorough kneading. Each mixture was filled into a plastic bag, which was stored at 25° C. for three months. During this period, the % residue of 5'-ribonucleotide was measured every one month, and, at the same time, samples of a 10% miso soup were prepared for comparing the taste and flavor.

Results of the measurement of % residue and of the sensory test of taste and flavor were shown in Table 5.

The sample No. 3 was higher in % residue even after 3 months, as compared with the control group, and more intense in taste and flavor.

TABLE 5

| | | % residue & sensory evaluation | | | |
|---|---|---|---|---|---|
| No. | Sample | 2 weeks later | 1 month later | 2 months later | 3 months later |
| 1 | Ribotide (Control 1) | 0 | 0 | 0 | 0 |
| 2 | Calcium 5'-ribonucleotide (B) (Experimental Example 1,) (Control 2) | 0 | 0 | 0 | 0 |
| 3 | Coated product (Example 4) | 100 +++ | 98.7 +++ | 96.4 +++ | 74.7 +++ |

Intensity of flavor: ±: same as control, + to +++: stronger than control

What we claim is:

1. A seasoning composition containing 5'-ribonucleotide salts having a water solubility less than about 1 g/100 g of water at 25° C. which are produced by coating fine particles of sparingly water-soluble 5'-ribonucleotide salts having a water solubility less than about 1 g/100 g water at 25° C. and having a total water content of 12 to 20 weight 5 and a particle diameter not exceeding about 150 μm with a member selected from the group consisting of oil, fat, wax or a mixture thereof melting at a temperature between about 55° C. to about 90° C.

2. The seasoning composition according to claim 1, wherein said 5'-ribonucleotide salts are edible alkaline earth meatl salts or aluminium salts of 5'-inosinate, 5'-guanylate or mixture thereof.

3. The seasoning composition according to claim 2, wherein said 5'-ribonucleotide is calcium 5'-inosinate, calcium 5'-guanylate or mixtures thereof.

4. The seasoning composition according to claim 1, wherein a total water content of said 5'-ribonucleotide salts is 12 to 16 weight %.

5. The seasoning composition according to claim 1, wherein said 5'-ribonucleotide salts have particles not larger than about 150 μm and not smaller than 20 μm account for at least about 80 weight %.

6. The seasoning composition according to claim 1, wherein a content of said ribonucleotide salts is in a range of 20 to 60 weight % in terms of anhydrates thereof.

7. A method of producing a seasoning composition, which comprises coating fine particles of 5'-ribonucleotide salts having a water solubility less than about 1 g/100 g water at 25° C. and having a total water content of 12 to 20 weight % and a particle diameter not exceeding about 150 μm with a member selected from the group consisting of oil, fat, wax or a mixture thereof melting at a temperature between about 55° C. to about 90° C.

8. The method according to claim 7, wherein said 5'-ribonucleotide are edible alkaline earth metal salts or aluminium salts of 5'-inosinate, 5'-guanylate or mixtures thereof.

9. The method according to claim 8, wherein said 5'-ribonucleotide salt is calcium 5'-inosinate, calcium 5'-guanylate or mixtures thereof.

10. The method according to claim 7, wherein a total water content of the 5'-ribonucleotide salts is 12 to 16 weight %.

11. The method according to claim 7, wherein the 5'-ribonucleotide salts have particles not larger than about 105 μm account for at least about 80 weight .

12. The method according to claim 7, wherein an oil/fat and/or a wax is coated to fine particles of said 5'-ribonucleotide salts so that a content of said 5'-ribonucleotide salts is in a range of 20 to 60 weight % in terms of anhydrate thereof.

13. The method according to claim 8, wherein the coating method is a spray granulation method which comprises dispersing fine particles of a 5'-ribonucleotide salt into a melt of a member selected from the group of oil, fat, wax or a mixture thereof melting at a temperature between about 55° C. to about 90° C., at about 60° to 105° C. and disc-spraying said dispersion into a cooling chamber maintained at 10° to 35° C.

* * * * *